United States Patent
Fischer

(10) Patent No.: US 7,316,419 B2
(45) Date of Patent: Jan. 8, 2008

(54) DAMPED STEERING ASSEMBLY

(75) Inventor: Jochem Fischer, Ostfildern (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 363 days.

(21) Appl. No.: 11/032,685

(22) Filed: Jan. 10, 2005

(65) Prior Publication Data

US 2005/0167966 A1    Aug. 4, 2005

(30) Foreign Application Priority Data

Jan. 22, 2004    (DE) .............. 10 2004 003 175

(51) Int. Cl.
*B62D 1/16* (2006.01)
(52) U.S. Cl. .................. 280/779; 280/771; 280/89
(58) Field of Classification Search .......... 280/89, 280/771, 775, 779; 74/493, 494, 495
See application file for complete search history.

(56) References Cited

U.S. PATENT DOCUMENTS

| | | | |
|---|---|---|---|
| 4,398,173 A * | 8/1983 | Kulischenko et al. ...... 340/439 |
| 4,432,565 A * | 2/1984 | Suzuki et al. .............. 280/779 |
| 5,315,203 A * | 5/1994 | Bicos ........................ 310/326 |
| 6,454,303 B2 * | 9/2002 | Ashtiani et al. ........... 280/779 |
| 6,520,678 B2 * | 2/2003 | Aiken et al. ................. 384/1 |
| 6,547,043 B2 * | 4/2003 | Card ........................ 188/267.2 |
| 6,572,178 B2 * | 6/2003 | Hartel et al. ........... 296/190.08 |
| 6,712,174 B1 * | 3/2004 | Bohner et al. ............. 180/402 |
| 6,752,425 B2 * | 6/2004 | Loh et al. .................. 280/779 |
| 6,814,177 B2 * | 11/2004 | Bohner et al. ............. 180/402 |
| 7,103,518 B2 * | 9/2006 | Ahmad et al. ................. 703/8 |
| 7,134,704 B2 * | 11/2006 | Fischer ........................ 296/72 |
| 2002/0008362 A1 * | 1/2002 | Ashtiani et al. .............. 280/89 |
| 2002/0130533 A1 * | 9/2002 | Hartel et al. ................. 296/187 |
| 2004/0084887 A1 * | 5/2004 | Loh et al. .................... 280/779 |
| 2005/0121896 A1 * | 6/2005 | Bonhard et al. ............. 280/779 |
| 2005/0173915 A1 * | 8/2005 | Stich .......................... 280/779 |
| 2005/0218642 A1 * | 10/2005 | Yamaguchi et al. ........ 280/779 |

FOREIGN PATENT DOCUMENTS

| | | |
|---|---|---|
| DE | 100 55 114 C2 | 5/2002 |
| DE | 101 12 738 C1 | 6/2002 |
| WO | WO 02/08045 A1 | 1/2002 |
| WO | WO 03/106246 A1 | 12/2003 |

* cited by examiner

*Primary Examiner*—Eric Culbreth
*Assistant Examiner*—Barry Gooden, Jr.
(74) *Attorney, Agent, or Firm*—Henry M. Feiereisen; Ursula B. Day

(57) ABSTRACT

A steering column for a motor vehicle includes upper steering-column portion, a lower steering-column portion, and a damping body for coupling the upper and lower steering-column portions, with piezoelectric elements being integrated in the damping body. These piezoelectric elements are part of an active system for vibration damping and are provided for compensating vibrations in length direction of the steering column and torsional vibrations in rotational direction of the steering wheel. The active system further includes piezoelectric elements in an attachment zone between the A-pillars and the support beam for compensating vibrations in length direction of the support beam and perpendicular thereto. Thus, the active system for vibration damping thus provides a vibration control in all three directions in space as well as control of torsional vibration.

14 Claims, 2 Drawing Sheets

DAMPED STEERING ASSEMBLY

CROSS-REFERENCES TO RELATED APPLICATIONS

This application claims the priority of German Patent Application, Serial No. 10 2004 003 175.4, filed Jan. 22, 2004, pursuant to 35 U.S.C. 119(a)-(d).

BACKGROUND OF THE INVENTION

The present invention relates, in general, to a damped steering assembly for a motor vehicle, and more particularly to a steering column in combination with a dashboard support and active vibration damping system.

Nothing in the following discussion of the state of the art is to be construed as an admission of prior art.

German Pat. No. 101 12 738 describes a dashboard support having a support beam between the A-pillars of a motor vehicle and an active system for vibration damping. Piezoelectric elements are hereby positioned in an attachment zone between the A-pillars and the support beam of the dashboard support, as well as in the attachment zone of the steering column to the support beam. When the dashboard support vibrates during operation of the vehicle, the vibration is detected by a sensor and damped by an actively produced compensating vibration.

It would be desirable and advantageous to provide an improved steering column to enhance a vibration damping, in particular in an area of the instrument panel.

SUMMARY OF THE INVENTION

According to one aspect of the present invention, a steering column for a motor vehicle for at least indirect connection to a dashboard support having a support beam, which extends between A-pillars of a vehicle body, and an active system provided for vibration damping and including a first group of piezoelectric elements in an attachment zone between the A-pillars and the support beam, and a second group of piezoelectric elements in an attachment zone of the steering column, includes an upper steering-column portion and a lower steering-column portion, a damping body coupling the upper and lower steering-column portions and having integrated therein a third group of piezoelectric elements.

The present invention resolves prior art problems by splitting the steering column into upper and lower steering-column portions, with the damping body placed between the upper and lower steering-column portions to couple them via intervention of piezoelectric elements. Through integration of the piezoelectric elements, generated vibrations can actively be compensated. In particular, vibrations in the length axis of the steering column and thus also in the length axis of the motor vehicle (X-direction) as well as torsional vibrations can be actively damped by the piezoelectric elements. As the majority of encountered vibrations is directed during vehicle operation along the steering column and transmitted onto the instrument panel, damping of vibration within the steering column, i.e. at the site where vibrations are generated and transmitted, becomes especially effective. Vibration damping in this area is advantageous and can be readily implemented with minimum energy expended.

By combining the piezoelectric elements on the dashboard support with the piezoelectric elements of the damping body, vibrations in all directions in space (X, Y, Z directions) and torsional vibrations can be damped. Suitably, vibrations in length direction of the instrument panel (Y direction) and in vertical direction (Z direction) are compensated by piezoelectric elements which are disposed in an attachment zone of the steering column on the support beam. Arrangement of piezoelectric elements in an attachment zone between the A-pillars and the support beam is also able to damp vibrations in Y direction. As a control of vibrations in direction of the steering column (X direction) and of torsional vibrations in rotation direction of the steering wheel is possible in accordance with the present invention, the overall stress on the motor vehicle is significantly reduced. In particular, vibrations caused by the undercarriage or the engine can thus be compensated almost entirely. As a result, vehicle handling and riding comfort are enhanced. In addition, various components, such as, e.g., the support beam of the dashboard support, but also attachments and mountings can be constructed simpler and with less weight. Overdimensioning of parts of the vehicle body, as recommended heretofore in order to counteract stress caused by vibrations, can be lessened, and the need for reinforcements of the vehicle body can be eliminated or at least reduced to a minimum.

According to another feature of the present invention, the damping body may have two body halves, whereby piezoelectric elements acting in a length direction of the steering column and piezoelectric elements acting in a circumferential direction of the steering column are integrated between the body halves. In this way, vibrations are especially effectively compensated. Transmission of structure-borne sound is cut in particular in the steering column. The effect of the piezoelectric elements is most effective there. Piezoelectric elements disposed in the damping body assure rapid response to generated control signals and active vibration compensation.

Control of vibrations in direction of the steering column (X direction) and control of torsional vibrations in rotation direction of the steering wheel involves a placement of the piezoelectric elements together in the damping body. The damping body is disposed between the upper and lower steering-column portions and is so constructed as to ensure a reliable coupling of the steering-column portions, without interfering with the steering behavior. The high-frequency vibration proportion in length direction of the steering column and the high-frequency vibration proportion of the torsional vibrations are controlled and actively compensated by the piezoelectric elements near the site of origin so that vibration compensation is very effectively.

According to another feature of the present invention, a controller, which cooperates with all the piezoelectric elements, and sensors, which are operatively connected to the controller, are provided. The sensors measure hereby generated vibrations in all directions in space as well as torsional vibration. An active vibration control can be carried out by using a respective control algorithm which evaluates acquired data in dependence on stored desired values. The data is hereby acquired by the sensors and transmitted to the controller which, after addressing the respective piezoelectric elements, sends a phase-shifted signal to the respective piezoelectric elements. As a consequence of their excitation by the controller, the piezoelectric elements oscillate to counteract the generated structure-borne sound to thereby realize a compensation of undesired vibrations.

According to another feature of the present invention, the piezoelectric elements can be constructed in the form of piezo-ceramic stack actuators. Stack actuators of a type involved here convert electric energy in mechanical energy in the absence of moving parts. This ensures a very rapid response and a long service life of the components. The principle of stack actuators is based on a change in shape of embedded crystals when exposed to an electric field. The result is an active excitation of the actuators by the controller and the generation of an opposing or compensation vibration between the respective components. An example of a stack actuator with very good properties includes a stack actuator of ceramic mixtures of lead zirconate titanate. This type of stack actuators has a high electromechanical activity. In other words, they exhibit a great ability to change length in relation to thickness in response to an applied voltage.

According to another aspect of the present invention, a damped steering assembly for a motor vehicle includes a steering wheel, a split steering column having an upper steering-column portion, which is connected to the steering wheel, and a lower steering-column portion, which is operatively connected to the wheels of the vehicle, a damping body coupling the upper and lower steering-column portions with one another and provided to damp vibration, and plural piezoelectric elements integrated in the damping body.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
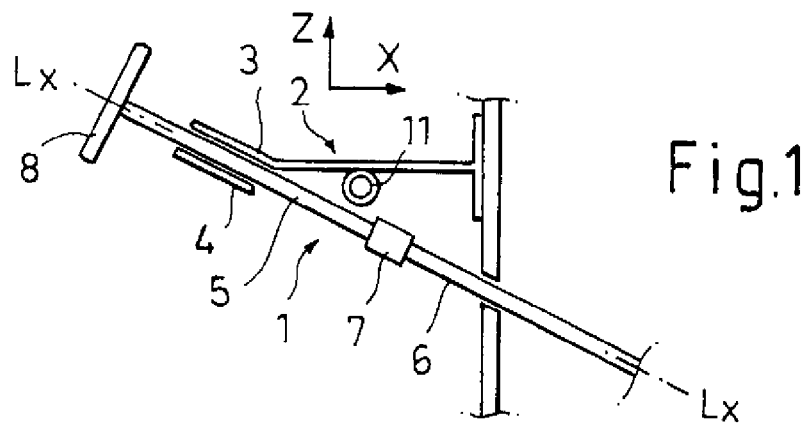
FIG. 1 is a simplified side view of a steering column having incorporated the subject matter of the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified side view of a steering column according to the present invention, generally designated by reference numeral 1, for an unillustrated motor vehicle. The steering column 1 defines a length axis Lx and is indirectly connected to a dashboard support 2 by means of an upper steering-column mounting 3 and a lower steering-column mounting 4. The steering column 1 is configured of split construction with an upper steering-column portion 5, which is operatively connected to a steering wheel 8, and a lower steering-column portion 6, which is operatively connected to unillustrated wheels of the motor vehicle. A damping body 7 links the upper steering-column portion 5 to the lower steering-column portion 6.

Figure 2:
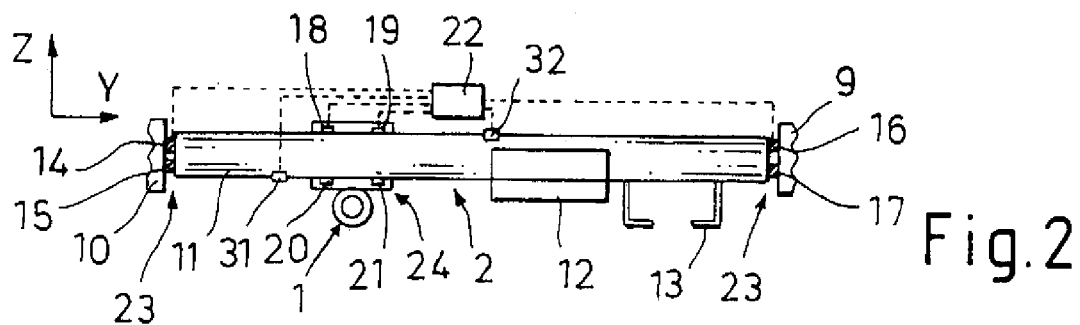
FIG. 2 is a simplified view of a dashboard support connected to the steering column of FIG. 1.

As shown in FIG. 2, the dashboard support 2 extends in the motor vehicle between the A-pillars 9, 10, only indicated here, of the vehicle body in a direction transversely to the traveling direction of the vehicle. The connection of the dashboard support 2 to the A-pillars 9, 10 is not shown in detail here but may be realized in any manner known to the artisan. The dashboard support 2 includes a hollow support beam 11 for carrying the dashboard or instrument panel (not shown) and is intended for attachment and securement of various vehicle components such as vehicle heater, ventilating and air conditioning system, airbag, center console, fuse box or glove compartment. FIG. 2 shows by way of example an airbag mounting 12 as well as a ventilating and air conditioning module 13.

Associated to the support beam 11 is an active system for vibration damping. The active system is implemented by providing on the support beam 11 ceramic piezoelectric elements 14, 15, 16, 17, 18, 19, 20, 21 which are operatively connected to a controller 22. An example of a piezoelectric element of ceramic material includes a stack actuator of a ceramic mixture of lead, zirconate and titanate. Structure and manner of operation of piezoelectric elements, involved here, are generally known to the artisan so that a detailed description is omitted for the sake of simplicity. Persons skilled in the art will understand that the active system must contain additional apparatus which does not appear in the foregoing Figures, e.g. a power source for supply of voltage, typically a 12 voltage or 24 voltage power source. For the sake of simplicity, this apparatus, or other components that may be provided, has been omitted from the Figures.

The piezoelectric elements 14, 15, 16, 17 are disposed in an attachment zone 23 between the A-pillars 9, 10 and the support beam 11, whereas the piezoelectric elements 18, 19, 20, 21 are disposed in the attachment zone 24 of the steering column 1 upon the support beam 11, e.g. through gluing.

The active system for vibration damping further includes piezoelectric elements 25, 26, 27, 28 which are incorporated in the damping body 7 that is integrated in the steering column 1 to couple the upper and lower steering-column portions 5, 6.

Figure 3:
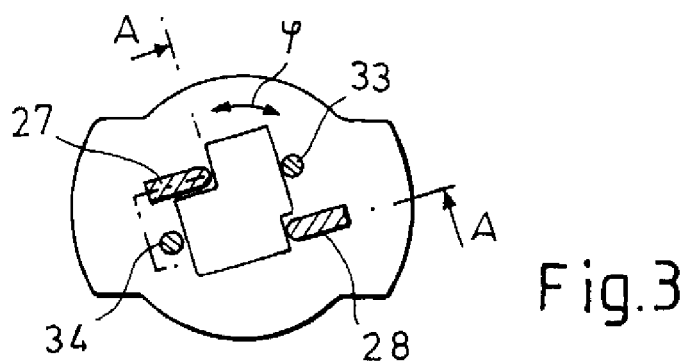
FIG. 3 is a cross sectional view of a damping body for incorporation in the steering column of FIG. 1.
Figure 4:
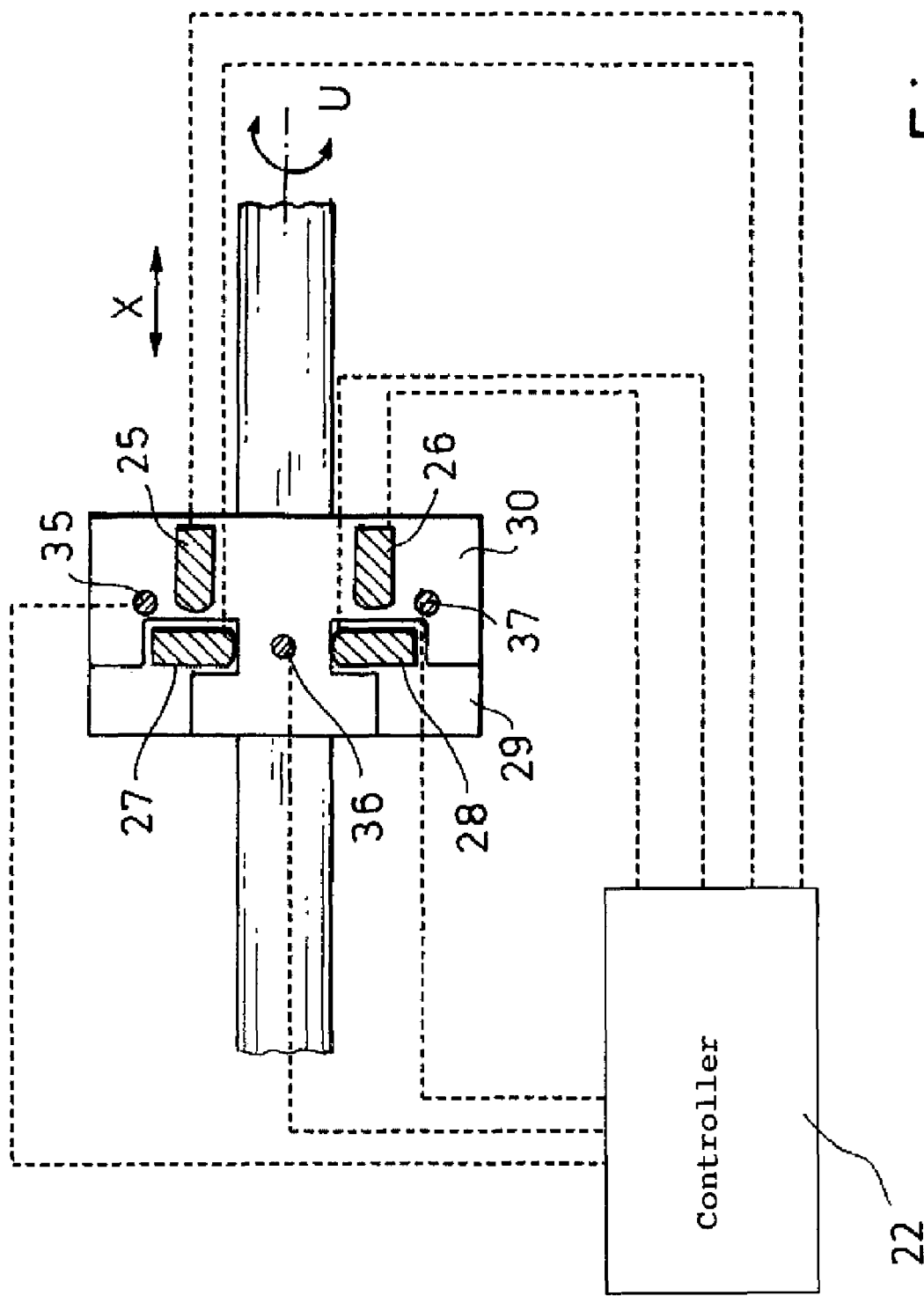
FIG. 4 is a sectional view of the damping body, taken along the line A-A in FIG. 3.

Referring now to FIG. 3, there is shown in more detail a cross sectional view of the damping body 7 and to FIG. 4 which shows the damping body 7 taken along the line A-A in FIG. 3. The damping body 7 is comprised of two body halves 29, 30 which are coupled to one another and have integrated therebetween the piezoelectric elements 25, 26, which are effective in length direction Lx of the steering column 1, and the piezoelectric elements 27, 28, which are effective in circumferential direction U of the steering column 1.

The active system for vibration damping further includes sensors 31, 32, 33, 34, 35, 36, 37 of which FIG. 2 shows only the sensors 31, 32 by way of example. The sensors 31, 32 are provided here for detecting vibration in the spatial directions Y and Z, i.e. in length direction of the dashboard support 2 and perpendicular thereto. The sensors, 33, 34, 35, 36, 37 are associated to the damping body 7, with sensors 33, 34 provided for detecting torsional vibration, as indicated by reference character φ, and with sensors 35, 36, 37 provided for detecting vibration in length direction Lx of the steering column 1. The sensors 31-37 are also operatively connected to the controller 22. During travel, generated vibrations are detected by the sensors 31-37 which generate respective signals for transmission to the controller 22.

The controller 22 evaluates the data inputted by the sensors and compares the data with stored desired values. In response to the comparison, the controller 22 sends for active intervention a phase-shifted signal to the piezoelectric elements 14-17, and/or 18-21, and/or 25-28. As a result, the piezoelectric elements 14-17, and/or 18-21, and/or 25-28 are excited by the controller 22 and oscillate to counteract the introduced structure-borne sound to thereby compensate the vibrations. Vibration is thus inhibited, or at least reduced to a minimum, from being transmitted onto the vehicle body.

By combining the piezoelectric elements 14-17; 18-21, positioned on the dashboard support 2, with the piezoelectric elements 25-28 integrated in the steering column 1 or damping body 1, a damping effect of vibrations is realized in all directions in space (X, Y, Z directions) as well as a damping of torsional vibrations ($\phi$ direction). Vibration in length direction of the dashboard support (Y direction) is compensated by the piezoelectric elements 18-21 in the attachment zone 24 of the steering column 1 to the support beam 11 of the dashboard support 2, and the piezoelectric elements 14-17 between the A-pillars 9, 10 and the support beam 11. The piezoelectric elements 14-17 can also be used to counteract vibration in vertical direction (Z direction). Vibration generated in length direction Lx of the steering column 1 ad thus also in length direction of the motor vehicle (X direction) can be compensated by the piezoelectric elements 25, 26 whereas torsional or rotational vibration $\phi$ in circumferential direction of the steering column 1 or rotation direction of the steering wheel 8 is counteracted by the piezoelectric elements 27, 28.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A steering column for a motor vehicle for at least indirect connection to a dashboard support having a support beam, which extends between A-pillars of a vehicle body, and an active system provided for vibration damping and including a first group of piezoelectric elements in an attachment zone between one of the A-pillars and the support beam, and a second group of piezoelectric elements in an attachment zone of the steering column to the support beam, said steering column comprising:
    an upper steering-column portion and a lower steering-column portion; and
    a damping body coupling the upper and lower steering-column portions and having integrated therein a third group of piezoelectric elements.

2. The steering column of claim 1, wherein the damping body has two body halves, with a first plurality of the third group of piezoelectric elements acting in a length direction of the steering column, and a second plurality of the third group of piezoelectric elements acting in a circumferential direction of the steering column.

3. The steering column of claim 1, and further comprising a controller cooperating with the first, second and third groups of piezoelectric elements, and sensors operatively connected to the controller.

4. The steering column of claim 1, wherein the piezoelectric elements are each constructed in the form of a piezoceramic stack actuator.

5. The steering column of claim 1, wherein the stack actuator is made of a ceramic mixture of lead zirconate titanate.

6. A damped steering assembly for a motor vehicle, comprising:
    a steering wheel;
    a split steering column having an upper steering-column portion, which is connected to the steering wheel, and a lower steering-column portion operatively connected to wheels of the vehicle; and
    an active vibration control system having a plurality of piezoelectric elements and receiving data commensurate with vibration generated in any spatial direction or torsional vibration, and causing oscillation of corresponding piezoelectric elements in response to the data for vibration compensation, said vibration control system including a damping body coupling the upper and lower steering-column portions with one another and having integrated therein a first and a second portion of the plurality of piezoelectric elements.

7. The steering assembly of claim 6, wherein the damping body has two body halves, with the first portion of the plurality of the piezoelectric elements acting in a length direction of the steering column, and the second portion of the plurality of piezoelectric elements acting in a circumferential direction of the steering column.

8. The steering assembly of claim 6, wherein the vibration control system includes a sensor assembly for acquiring the data, and a controller receiving the data from the sensor assembly operatively connected to the piezoelectric elements.

9. A steering column for a motor vehicle, comprising:
    an upper steering-column portion, which is connected to a steering wheel, and a lower steering-column portion; and
    a damping body linking the upper and lower steering-column portions and having integrated therein a plurality of piezoelectric elements for compensating vibration generated in a, length direction of the upper and lower steering-column portions and torsional vibration generated in a rotational direction of the steering wheel.

10. The steering column of claim 9, wherein the damping body has two body halves, with the piezoelectric elements acting between the body halves.

11. In combination with a motor vehicle:
    a steering column including an upper steering-column portion and a lower steering-column portion; a damping body linking the upper and lower steering-column portions;
    a dashboard support having a support beam which extends between two A-pillars of the motor vehicle; and
    an active system provided for vibration damping and including a first group of piezoelectric elements in an attachment zone between one of the A-pillars and the support beam, a second group of piezoelectric elements in an attachment zone of the steering column to the support beam, and a third group of piezoelectric elements integrated in the damping body.

12. The combination of claim 11, wherein the damping body has two body halves, with a first plurality of the third group of piezoelectric elements acting in a length direction of the steering column, and a second plurality of the third group of piezoelectric elements acting in a circumferential direction of the steering column.

13. The combination of claim 11, further comprising a sensor assembly for detecting generated vibration, and a controller receiving from the sensor assembly a signal in response to a detected vibration for exciting respective piezoelectric elements of the first, second and third groups of piezoelectric elements to counteract the detected vibration.

14. An active system for damping vibration encountered by a steering column and dashboard support of a motor vehicle, comprising:

first piezoelectric elements in an attachment zone between an A-pillar and a support beam of the dashboard support for compensating vibration in a length direction of the support beam and compensating vibration perpendicular thereto;

second piezoelectric elements disposed in an attachment zone of the steering column to the support beam for compensating vibration in the length direction of the support beam; and third piezoelectric elements integrated in a damping body disposed between upper and lower steering column portions of the steering column for compensating vibrations in a length direction of the steering column; and fourth piezoelectric elements integrated in the damping body for compensating torsional vibration in a rotational direction of the steering wheel which is connected to the upper steering column portion.

* * * * *